E. A. CHASE.
STONE PROFILING MACHINE.
APPLICATION FILED APR. 29, 1919.
1,336,942.
Patented Apr. 13, 1920.
2 SHEETS—SHEET 1.
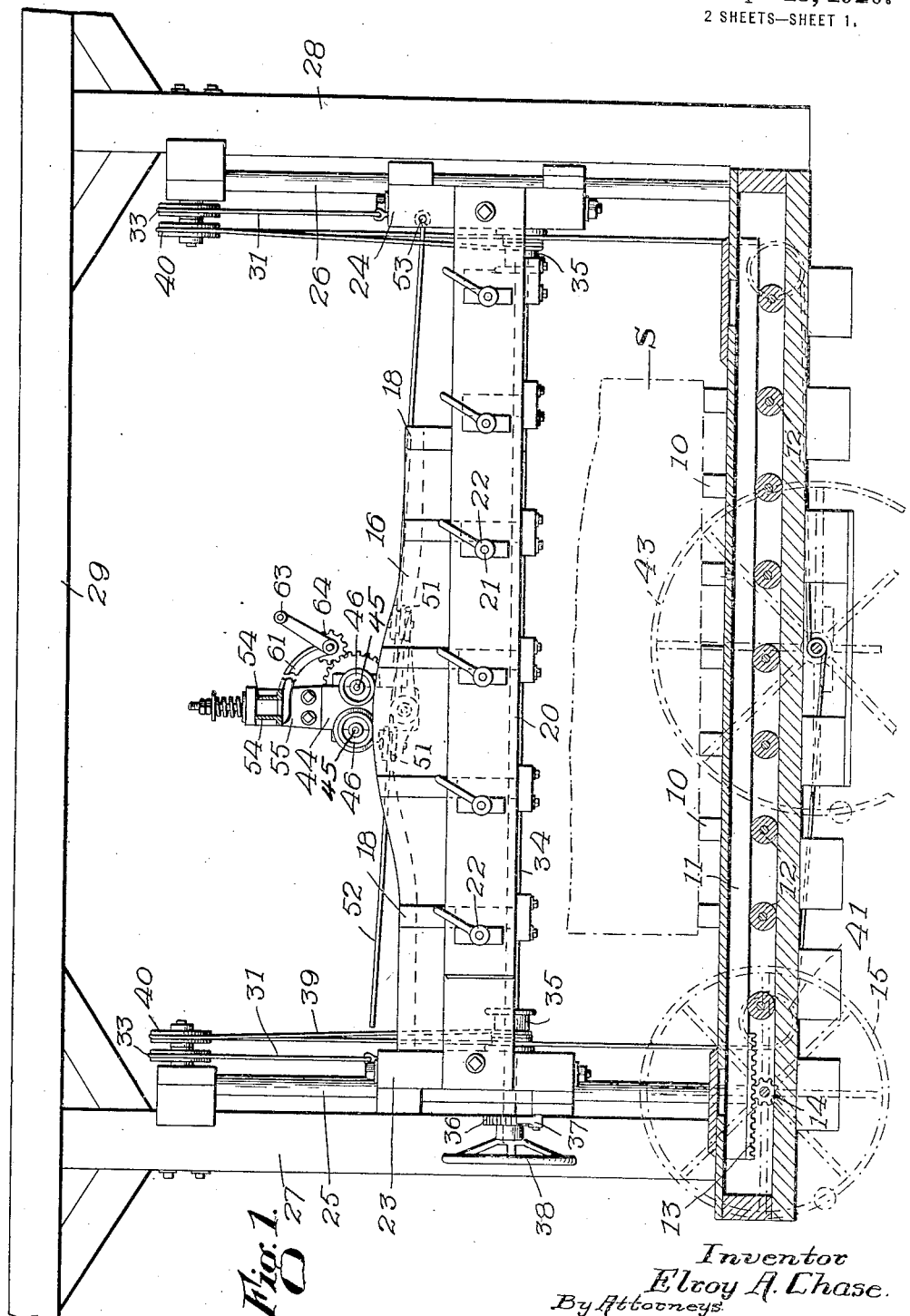
Inventor
Elroy A. Chase.
By Attorneys
Southgate & Southgate

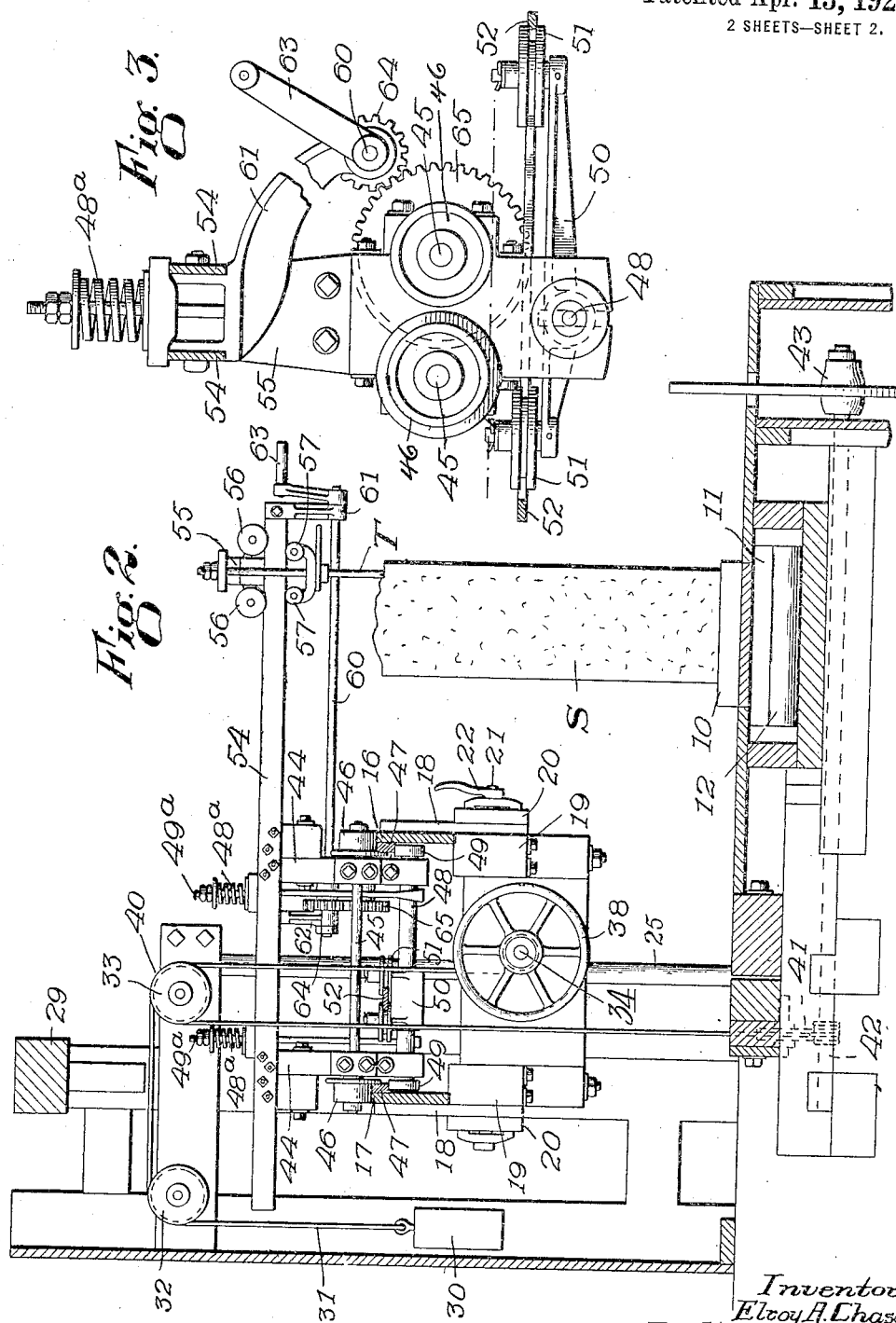

UNITED STATES PATENT OFFICE.

ELROY A. CHASE, OF NORTHFIELD, VERMONT, ASSIGNOR TO PHILLIPS & SLACK, INC., OF NORTHFIELD, VERMONT, A CORPORATION OF VERMONT.

STONE-PROFILING MACHINE.

1,336,942.   Specification of Letters Patent.   Patented Apr. 13, 1920.

Application filed April 29, 1919. Serial No. 293,428.

*To all whom it may concern:*

Be it known that I, ELROY A. CHASE, a citizen of the United States, residing at Northfield, in the county of Washington and State of Vermont, have invented a new and useful Stone-Profiling Machine, of which the following is a specification.

This invention relates to a machine which is particularly designed for finishing or profiling the top surfaces of monumental stone and other similar articles.

It is the usual practice to lay out work of this character on the stone itself and to cut the edges to the desired pattern by tools which are hand-operated or at least hand-controlled. The material between the finished edges, often of considerable extent, is then worked down to proper relation with the edges.

It is the object of my invention to provide a machine by which the latter operation may be performed with a reduced expenditure of time and labor while improved results are attained.

To this end, my invention consists broadly in the provision of a suitable pattern, and of means through which the pattern may be utilized to control the position of the cutting tool relatively to the stone for the profiling or surfacing operation.

Important features of my invention relate to the provision of means for adjusting the position of the pattern and the stone relatively to each other, and to the construction for guiding and supporting the tool in definite relation to the stone and pattern. I have also provided as part of my invention an improved guiding device for the pattern carriage by which the transverse alinement of the carriage is preserved while at the same time a short wheel base on the pattern is secured.

My invention further relates to arrangements and combinations of parts which will be hereinafter described and more particularly pointed out in the appended claims.

A preferred form of my invention is shown in the drawings, in which—

Figure 1 is a front elevation of my improved machine;

Fig. 2 is an end elevation partly in section, and

Fig. 3 is a front elevation of the pattern carriage with the tool carriage omitted.

Referring to the drawings, I have shown the stone S which is to be profiled supported upon blocks 10 on a carriage 11 longitudinally movable upon a series of rolls 12 (Fig. 1). The carriage is provided with a rack 13 meshing with a pinion 14 rotatable by a hand wheel 15 through which the carriage and stone may be adjusted longitudinally.

Pattern plates 16 and 17 are provided, each having a plurality of upright bars 18 secured thereto and extending downward between cross beams 19 and clamping plates 20. Clamping bolts 21 and nuts 22 are used to securely grip the bars 18 and hold the pattern plates firmly in position upon the cross beams 19. The beams 19 are connected at each end by end members 23 and 24 to form a cross frame vertically slidable upon fixed shafts 25 and 26 which are held in position by an outer frame work comprising uprights 27 and 28, and a top beam 29. Counterweights 30 (Fig. 2) are connected to the end members 23 and 24 by ropes 31 running over guide pulleys 32 and 33, and partially counterbalance the weight of the cross frame and of the parts associated therewith.

Suitable provision is made for vertically adjusting the cross frame. Such provision is shown in the drawings as comprising a shaft 34 (Fig. 1) extending longitudinally of the machine and provided with a winding pulley 35 on each end thereof. Outside of the frame, a ratchet wheel 36 on the shaft is engaged by a pawl 37 mounted on the frame, and a hand wheel 38 is provided for turning the shaft. A flexible cable, chain or rope 39 is secured to each winding pulley 35, from which it extends upward around a fixed guide pulley 40, and then around a second guide pulley 41 in the base of the machine to a cross shaft 42 supported in bearings in the base and extending under the carriage 11 to the front of the machine, where it is provided with a large wheel 43 for hand or foot operation. For rapid adjustment to bring the cross frame to approximate vertical position, the hand wheel 38 will be used while for small adjustments, particularly during the operation of the machine, the wheel 43 will commonly be used. Suitable provision may be made for securing the cross frame in any desired position.

A pattern carriage 44 is provided with two cross shafts 45, on the opposite ends of which flanged rolls 46 are secured. These rolls rest upon the upper faces of the pattern plates 16 and 17, and the flanges fit loosely between ribs or strips 47 secured to the inner faces of the pattern plates 16 and 17 and similarly shaped. An additional cross shaft 48 is vertically slidable in the carriage 44, and supports rolls 49 at each end thereof which engage the under sides of the strips 47. Springs 48$^a$ are connected by rods 49$^a$ to draw the lower rolls 49 upward against the strips 47, and thus firmly seat the carriage 44 upon the pattern plates.

It will be seen that the shafts 45 are relatively close together, providing a very short wheel base so that the pattern may be accurately reproduced. The shortness of the wheel base, however, necessitates special provision for retaining proper transverse alinement of the carriage relatively to the pattern plates, and for this purpose I provide a casting 50 loosely pivoted upon the lower shaft 48 of the carriage, and provided at each end with a pair of rolls 51, each pair engaging the opposite edges of a guide bar 52 pivoted at 53 (Fig. 1) to the end frame 24. As the bar 52 is pivoted to swing about one end thereof, and as the casting 50 is pivoted to swing about the shaft 48, these parts will adapt themselves to every position of the pattern carriage 44, while at the same time the engagement of the separated pairs of rolls 51 with the bar preserves transverse alinement of the carriage.

Cross bars or plates 54 are bolted to the upper part of the carriage 44 and extend forwardly over the stone S and carriage 11, as shown in Fig. 2. The bars 54 constitute a support for a tool carriage 55 having upper rolls 56 and lower rolls 57 engaging the bars in spaced relation. A suitable stone cutting tool T on the tool carriage 55 is positioned to engage the upper surface of the stone S. This tool may be of any usual construction, and as it constitutes no part of my invention the details thereof are not shown herein. The tools most commonly used are pneumatically operated.

A shaft 60 is mounted in brackets 61 and 62 on the cross bars 54, and is provided at its front end with a handle 63 and at its rear end with a pinion 64 engaging a gear 65 on one of the roll shafts 45. By turning the handle 63, the pattern carriage may be easily moved to any desired position along the pattern plates 16 and 17.

Having described the construction of my improved machine, the operation will be readily apparent. The stone S, after having its edges outlined in accordance with the pattern, is placed on the carriage 11, while the corresponding pattern plates 16 and 17 are clamped to the cross frame. The stone is then adjusted longitudinally to a position corresponding to that of the pattern plates, and the plates are vertically adjusted to bring the tool T in the proper vertical relation to the edges of the stone S. The tool T is then placed in operation and is caused to travel over the unfinished surface of the stone by manually moving the tool carriage 55 backward and forward along the cross bars 54, and also by moving the carriers 44 along the pattern by means of the handle 63.

If any small vertical adjustment is necessary during the cutting operation, this may be made by means of the wheel 43, which can be readily turned by the hand or foot of the operator. In this way the tool T may be caused to travel over the entire surface of the stone, and it is always maintained in the proper vertical relation to the finished edges of the stone.

As before described, the bar 52 maintains the transverse alinement of the carriage 44 in position, and the springs 48$^a$ acting through the rolls 49 hold the pattern carriage in firm contact with the pattern. It will be understood that these pattern plates are made in any form, to correspond to the outline of the particular stone to be finished.

The shaft 42 should not turn too readily in its bearings that the vertical adjustment controlled thereby may be maintained.

Having thus described my invention, it will be evident that changes and modifications can be made therein by those skilled in the art without departing from the spirit and scope thereof as set forth in the claims, and I do not wish to be otherwise limited to the details herein disclosed, but what I do claim is:—

1. A stone profiling machine comprising a pattern, means to raise and lower said pattern, means to relatively adjust the pattern and stone longitudinally, a carriage movable longitudinally on said pattern, and a tool carrier mounted to move transversely on said carriage and effective to position a cutting tool in accordance with said pattern.

2. A stone profiling machine comprising a fixed frame, a cross frame vertically adjustable on said fixed frame, a pattern mounted on said cross frame, a pattern carriage on said cross frame vertically positioned by said pattern, and a tool carrier horizontally movable on said pattern carriage.

3. A stone profiling machine comprising a pattern, a carriage movable longitudinally on said pattern, a cross arm on said carriage projecting over the stone to be profiled, and a carrier movable on said cross arm and effective to position a cutting tool in accordance with said pattern.

4. A stone profiling machine having, in combination, a frame, a pair of pattern plates secured thereto, a pattern carriage movably mounted on said plates, an arm projecting from said carriage, and a tool carrier movably mounted on said arm.

5. A stone profiling machine comprising a fixed frame, a cross frame mounted on said fixed frame, separate devices for relatively fast and relatively slow vertical adjustment of said cross frame on said fixed frame, a pattern on said cross frame, and means coöperating with said pattern to raise and lower a cutting tool independently of said cross frame.

6. A stone profiling machine comprising a pattern, a cross frame supporting said pattern, means to adjust said frame vertically, additional means by which the operator may make small vertical adjustments of said frame while in position to operate the machine, and separate means to position a cutting tool vertically in accordance with the pattern.

7. A stone profiling machine comprising a fixed frame, pattern plates adjustably secured thereon, a pattern carriage movable along and entirely supported by said plates, means to hold said carriage in yielding engagement with said plates, and manual means to move said carriage along said plates.

8. A stone profiling machine having, in combination, a frame, pattern plates having ribs thereon and mounted on said frame, a pattern carriage movably mounted on said plates, rolls on said carriage, and springs on said carriage effective to draw said rolls into yielding engagement with said ribs to seat said carriage on said pattern plates.

9. A stone profiling machine comprising pattern plates, a pattern carriage movably mounted thereon, and means to maintain transverse alinement of said carriage on said pattern plates, said means comprising longitudinally spaced rolls on said carriage mounted for vertical movement thereon, and a guide bar coöperating with said rolls.

10. A stone profiling machine comprising pattern plates, a pattern carriage, rolls on said carriage engaging said plates, means to hold said rolls in engagement with said plates, and means to rotate certain of said rolls to move the carriage along said plates.

11. A stone profiling machine having, in combination, a frame, a pair of pattern plates secured thereto, a pattern carriage movably mounted on said plates, a member pivoted to swing transversely of said carriage, separated pairs of rolls on said member, and a bar pivoted to said frame and extending between said rolls, whereby transverse alinement of said pattern carriage on said pattern plates is maintained.

In testimony whereof I have hereunto affixed my signature.

ELROY A. CHASE.